(12) United States Patent
Alvarez et al.

(10) Patent No.: US 10,697,437 B1
(45) Date of Patent: Jun. 30, 2020

(54) ROTATABLE SUPPORT FIXTURE FOR WIND TURBINE BLADE

(71) Applicants: Alberto J. Alvarez, Fort Worth, TX (US); Andrew J. Sullivan, Bedford, TX (US)

(72) Inventors: Alberto J. Alvarez, Fort Worth, TX (US); Andrew J. Sullivan, Bedford, TX (US)

(73) Assignee: BNSF Logistics, LLC, Springdale, AR (US)

( * ) Notice: Subject to any disclaimer, the term of this patent is extended or adjusted under 35 U.S.C. 154(b) by 0 days.

(21) Appl. No.: 16/552,625

(22) Filed: Aug. 27, 2019

(51) Int. Cl.
*F03D 13/40* (2016.01)
*A47B 81/00* (2006.01)
*B60P 3/40* (2006.01)

(52) U.S. Cl.
CPC ............ *F03D 13/40* (2016.05); *A47B 81/005* (2013.01); *B60P 3/40* (2013.01)

(58) Field of Classification Search
CPC . F03D 13/40; F03D 1/00; F03D 1/003; F03D 1/005; F05B 2260/02; F05B 2250/41; F05B 2230/61; F05B 2230/60; F05B 2230/80; F05B 2260/30; A47B 81/005; B60P 3/40; B60P 3/41; B62B 3/10; B62B 3/04; B65D 85/68; B65D 2585/6897
USPC ........... 410/44, 45, 53, 32–35, 49, 120, 156; 105/396, 404, 407, 411, 355, 393; 269/55, 76, 246, 17, 58, 287; 414/800, 414/678, 763, 426, 430, 433
See application file for complete search history.

(56) References Cited

U.S. PATENT DOCUMENTS

| | | | | |
|---|---|---|---|---|
| 698,231 | A * | 4/1902 | Starzman | A47F 7/04 211/24 |
| 1,507,911 | A * | 9/1924 | Eichman | B25B 11/00 269/99 |
| 1,615,860 | A * | 2/1927 | Williams | B25B 1/22 269/76 |
| 2,006,451 | A * | 7/1935 | Glidden | B01F 9/0014 366/213 |
| 2,320,079 | A * | 5/1943 | Hartwig | B23K 37/0452 269/69 |
| 2,557,228 | A * | 6/1951 | King | B65G 47/24 414/765 |
| 3,069,153 | A * | 12/1962 | Brown | B23K 37/0452 269/58 |
| 3,402,904 | A * | 9/1968 | Paraskewik | F42B 39/22 410/44 |
| 3,497,082 | A * | 2/1970 | Flitter | B65H 15/02 414/766 |
| 3,521,875 | A * | 7/1970 | Kapelsohn | B23K 37/0452 269/58 |
| 3,868,101 | A * | 2/1975 | Nozaki | B23K 37/0452 269/25 |
| 4,039,115 | A * | 8/1977 | Randolph | B23K 37/0538 228/44.5 |

(Continued)

*Primary Examiner* — Jonathan Liu
*Assistant Examiner* — Devin K Barnett
(74) *Attorney, Agent, or Firm* — Dan Brown Law Office; Daniel R. Brown (57) ABSTRACT

A support fixture for a wind turbine blade that enables rotation of the blade about its longitudinal axis, and which includes a conformal insert. A selectively deployable stacking frame portion is provided. The support fixture is interchangeably useful for rail, ocean, barge, and truck transportation modes, as well as for static storage.

16 Claims, 7 Drawing Sheets

(56) References Cited

U.S. PATENT DOCUMENTS

| | | | | |
|---|---|---|---|---|
| 4,491,307 | A * | 1/1985 | Ellefson | B23K 37/0452 269/246 |
| 4,686,925 | A * | 8/1987 | Stuck | B63B 71/00 114/224 |
| 5,904,347 | A * | 5/1999 | Lin | B23K 37/0452 269/76 |
| 6,540,470 | B2 * | 4/2003 | Smith | B60S 3/041 134/123 |
| 7,303,365 | B2 | 12/2007 | Wobben | |
| 7,517,198 | B2 * | 4/2009 | Baker | F03D 1/0675 416/227 R |
| 7,591,621 | B1 * | 9/2009 | Landrum | B60P 3/40 410/44 |
| 7,670,090 | B1 * | 3/2010 | Landrum | B60P 3/40 410/44 |
| 7,878,753 | B2 * | 2/2011 | Kielian | B66C 1/20 269/17 |
| 7,967,536 | B2 * | 6/2011 | Broderick | B60P 3/40 410/120 |
| 8,511,921 | B2 * | 8/2013 | Riddell | B60P 3/40 401/44 |
| 8,671,536 | B2 * | 3/2014 | Spanos | F01D 25/285 29/281.1 |
| 8,672,131 | B2 * | 3/2014 | Nogueira | B65D 85/68 206/521 |
| 8,961,085 | B2 * | 2/2015 | Ressel | B60P 3/40 410/44 |
| 8,985,920 | B2 * | 3/2015 | Bitsch | F03D 13/40 410/44 |
| 9,011,054 | B2 | 4/2015 | Thomsen | |
| 9,144,863 | B2 * | 9/2015 | Pedersen | B23P 11/00 |
| 9,358,996 | B2 | 6/2016 | Van Der Zee | |
| 9,463,541 | B2 * | 10/2016 | Sherrill | B23Q 3/064 |
| 10,066,606 | B2 * | 9/2018 | Thomsen | F03D 80/00 |
| 10,208,498 | B2 * | 2/2019 | Pedersen | F03D 80/70 |
| 10,589,941 | B2 * | 3/2020 | Van Der Zee | F03D 1/0675 |
| 2005/0031431 | A1 * | 2/2005 | Wobben | F03D 13/40 410/45 |
| 2005/0212191 | A1 * | 9/2005 | McKelvie | B60S 13/00 269/17 |
| 2007/0189895 | A1 * | 8/2007 | Kootstra | F03D 80/00 416/9 |
| 2009/0020445 | A1 * | 1/2009 | Koike | H01M 8/0252 206/319 |
| 2009/0169323 | A1 * | 7/2009 | Livingston | F03D 1/0675 410/120 |
| 2010/0252977 | A1 * | 10/2010 | Jorgensen | F03D 13/40 269/287 |
| 2011/0031292 | A1 * | 2/2011 | Krogh | B60P 3/40 224/553 |
| 2011/0109030 | A1 * | 5/2011 | Flaig | B23K 37/0538 269/55 |
| 2011/0142660 | A1 * | 6/2011 | Bakhuis | F03D 13/10 416/223 R |
| 2012/0124833 | A1 * | 5/2012 | Arendt | F03D 13/40 29/889.7 |
| 2012/0192420 | A1 * | 8/2012 | Krogh | F03D 13/40 29/889 |
| 2013/0216325 | A1 * | 8/2013 | Johnson | F03D 13/40 410/44 |
| 2013/0315685 | A1 * | 11/2013 | Pedersen | F03D 13/40 410/44 |
| 2013/0319891 | A1 * | 12/2013 | Lieberknecht | B65D 85/68 206/448 |
| 2014/0064870 | A1 * | 3/2014 | Thomsen | B60P 3/40 410/44 |
| 2014/0193255 | A1 * | 7/2014 | Hancock | F03D 13/10 416/1 |
| 2014/0305743 | A1 * | 10/2014 | Poulsen | B65G 1/10 187/244 |
| 2014/0314576 | A1 * | 10/2014 | Lieberknecht | F03D 13/10 416/220 R |
| 2015/0192104 | A1 * | 7/2015 | Lulker | F03D 13/40 206/493 |
| 2015/0198140 | A1 * | 7/2015 | Sigurdsson | F03D 13/40 211/60.1 |
| 2015/0285216 | A1 * | 10/2015 | Van Der Zee | A47B 81/00 414/802 |
| 2015/0300314 | A1 * | 10/2015 | Van Der Zee | F16B 2/08 211/85.8 |
| 2015/0369209 | A1 * | 12/2015 | Datta | F03D 13/40 211/85.8 |
| 2016/0017861 | A1 * | 1/2016 | Sigurdsson | F03D 13/40 410/45 |
| 2016/0053740 | A1 * | 2/2016 | Landrum | F03D 13/40 414/800 |
| 2018/0195497 | A1 * | 7/2018 | Neumann | F03D 13/40 |
| 2019/0301431 | A1 * | 10/2019 | Uyunuk | B62B 5/0086 |
| 2020/0063715 | A1 * | 2/2020 | Sullivan | B60P 7/132 |

* cited by examiner

ROTATABLE SUPPORT FIXTURE FOR WIND TURBINE BLADE

RELATED APPLICATIONS

None.

BACKGROUND OF THE INVENTION

Field of the Invention

The present invention relates to support fixtures for the transportation and storage of wind turbine blades. More particularly, blade support fixtures having a rotatable cradle for aligning the blade at an optimum position for either compact storage or for clearance optimization across multiple modes of transportation.

Description of the Related Art

The continued growth of wind power utilization has led to increasingly larger wind turbine structures. This has presented a number of challenges in the field of logistics for transporting wind turbine components from the points of manufacturer to the points of utilization. Since the distances involved are of a global scale, various modes of transportation are routinely employed, including ocean vessels, barges, railroads and trucks. In the particular case of wind turbine blades, which are very large and relatively fragile, various support fixtures have been developed to facilitate efficient and economical transportation, including intermodal systems of transportation.

The assignee of the present disclosure holds a range of US patents that are germane to the logistics of wind turbine blade transportation. These patents are listed below, and the entire contents and teachings of all of these patents are hereby incorporated by reference, and in their entirety, for all purposes.
  A) U.S. Pat. No. 7,591,621 issued on Sep. 22, 2009 to Landrum et al. for Wind Turbine Blade Transportation System and Method.
  B) U.S. Pat. No. 7,670,090 issued on Mar. 2, 2010 to Landrum et al. for Wind Turbine Blade Transportation System and Method.
  C) U.S. Pat. No. 8,708,625 issued on Apr. 29, 2014 to Landrum et al. for Wind Turbine Blade Railroad Transportation System and Method.
  D) U.S. Pat. No. 8,834,082 issued on Sep. 16, 2014 to Landrum et al. for Wind Turbine Blade Railroad Transportation System and Method.
  E) U.S. Pat. No. 9,315,200 issued on Apr. 19, 2016 to Landrum et al. for Wind Turbine Blade Railroad Transportation With Two Axis Translation.
  F) U.S. Pat. No. 9,347,426 issued on May 24, 2016 to Landrum et al. for Wind Turbine Blade Railroad Transportation System and Method.
  G) U.S. Pat. No. 9,494,140 issued on Nov. 15, 2016 to Sigurdsson for Frame Support Assembly For Transporting Wind Turbine Blades.
  H) U.S. Pat. No. 9,567,969 issued on Feb. 14, 2017 to Sigurdsson for Systems and Methods For Transporting Wind Turbine Blades.
  I) U.S. Pat. No. 9,790,927 issued on Oct. 17, 2017 to Landrum et al. for Wind Turbine Blade Double Pivot Transportation System and Method.
  J) U.S. Pat. No. 10,030,633 issued Jul. 24, 2018 to Sigurdsson for System and Method for Transporting Wind Turbine Blades.

The logistic issues of transporting wind turbine blades varies, depending on the mode of transportation involved. For example, in ocean transport, engineers will prefer to closely pack a large number of wind turbine blades together so as to maximize the quantity that can be placed onto a single ship, while carefully considering the logistics of loading and off-loading. For rail transport, engineers will be concerned with railway clearance issues, particularly respecting overhead clearing for bridges and trestles, and lateral clearances in acute curved sections of railways, given the remarkably long lengths involved with modern wind turbine blades. In the case of truck transport, the clearance issues are even more acute, with overhead clearance being highly problematic given the presence of bridges, underpasses, and utility overhead and easement clearance limitations.

It should be noted that the fixtures, stands, bolsters, and other attachment equipment used to transport wind turbine blades represent a substantial cost factor, so that fixture design considerations present opportunities for streamlining logistics of wind turbine blade transportation, and controlling costs of doing so. It is desirable to use these structures across various modes of transportation where possible, as this saves on equipment cost and reduces the amount of handling required during intermodal operations. It should also be noted that the challenges related to vertical clearance and lateral clearance change depending on the mode of transportation. This presents a particular challenge regarding fixtures that are used across multiple modes of transportation. Since the wind turbine blades present a broad airfoil chord depth near the root end of each blade, the angular orientation of the blade can be optimized for vertical or lateral clearance issues depending on which mode of transportation is involved. Thus it can be appreciated that there is a need in the art for improved fixtures for transporting wind turbine components that use multiple modes of transportation.

SUMMARY OF THE INVENTION

The need in the art is addressed by the apparatuses of the present invention. The present disclosure teaches a support fixture for a wind turbine blade that includes a base frame for support on a horizontal structure, such as a ship deck, a barge, a railcar, or a truck. The support fixture includes four bearing pedestals that are fixed to the base frame, each supporting a pair of grooved wheels that rotate along parallel axes, and which are arranged as first and second pairs of bearing pedestals that are laterally opposing and oriented such that the grooved wheels are disposed along corresponding first and second circular arcs of rotation, having equal radii. The first and second pairs of bearing pedestals are longitudinally spaced apart a distance such that the first and second circular arcs of rotation are parallel to one another and aligned along a common longitudinal axis of rotation. The support fixture also includes a blade cradle assembly that includes a blade cradle with a pair of trunnion discs, which are aligned in parallel, fixed to the blade cradles, and which are spaced apart by the same distance. The blade cradle and the pair of trunnion discs include openings therethrough to facilitate insertion of the wind turbine blade through the blade cradle assembly. The pair of trunnion discs each have circular outer periphery portions along equal radii corresponding to the first and second arcs of rotation, and have an edge profiles that conform to the shape of the grooved wheels. The circular outer periphery portions of the pair of trunnion discs rotatably engage the grooved wheels in the first and second pairs of bearing cradles, respectively, to facilitate rotation of the bearing cradle assembly about the common longitudinal axis of rotation. With this, the wind turbine blade can be rotated along its longitudinal axis while retained in the support fixture.

In a specific embodiment of the foregoing support fixture, the four bearing pedestals are bilaterally symmetric about a plane that is parallel to the parallel axes of the grooved wheels, and located midway between the corresponding pair of grooved wheels. In addition, the base frame further includes first and second pairs of laterally opposing inclined mounting surfaces that supportably engage the first and second pairs of bearing pedestals, and thusly locate the grooved wheels along the first and second arcs of rotation.

In a specific embodiment of the foregoing support fixture, the base frame further includes plural twistlock corner castings useful to secure the support fixture to a transportation vehicle or to other support fixtures. In a refinement to this embodiment, the support fixture further includes a stacking frame portion that is selectively attachable to an upper portion of the base frame, to provide structure above the wind turbine blade and enable stacking of plural similar support fixtures. In another refinement to this embodiment, the stacking frame portion engages the base frame with structural members that telescopically overlap.

In a specific embodiment of the foregoing support fixture, the grooved wheels are V-groove wheels, and the pair of parallel trunnion disc edge profiles employ bevelled edges to conform with the V-groove wheels.

In a specific embodiment, the foregoing support fixture further includes an anti-rotation assembly disposed between the base frame and the blade cradle assembly, which is selectively engageable at plural rotatable position about the common longitudinal axis of rotation, to thereby fix the blade cradle assembly and the wind turbine blade at selected positions and maintain it against rotation. In a refinement to this embodiment, the anti-rotation assembly includes a bracket fixed to the base frame, a locating pin, and plural holes formed through at least one of the trunnion discs, wherein the locating pin is inserted through the bracket and one of the plural holes.

In a specific embodiment of the foregoing support fixture, the blade cradle is formed of a generally U-shaped structural material, and includes a slotted opening formed into an upper portion thereof, through which the wind turbine blade can be inserted from above.

In a specific embodiment, the foregoing support fixture further includes a conformal insert with an exterior shape conformed to fit the blade cradle along its interior surface, and an interior opening conformed to the exterior surface of the wind turbine blade at the position from which the wind turbine blades is to be supported. In a refinement to this embodiment, the conformal insert is fabricated from a closed cell polymeric foam material. In another refinement to this embodiment, the support fixture further includes plural conformal insert retaining guides fixed to the blade cradle assembly, and aligned to limit longitudinal movement of the conformal insert.

The present disclosure also teaches a support fixture for a wind turbine blade, which is suitable for intermodal shipment thereof via ocean vessel, barge, rail or truck, particularly when employed with a corresponding root end support fixture that engages a root end of the wind turbine blade. The support fixture includes a base frame and plural bearing pedestals fixed to the base frame, each supporting at least one grooved wheel that rotates along an axis substantially parallel to a longitudinal axis of the wind turbine blade. The plural bearing pedestals are arranged as at least a first and second pair of bearing pedestals that are laterally opposing one another and oriented such that the grooved wheels are disposed along corresponding first and second circular arcs of rotation, both having equal radii. The first and second pairs of bearing pedestals are longitudinally spaced apart a distance such that the first and second circular arcs of rotation are parallel to one another and aligned along a common longitudinal axis of rotation that is substantially parallel to the longitudinal axis of the wind turbine blade. The support fixture also includes a blade cradle assembly that consists of a blade cradle with a pair of trunnion discs, aligned in parallel, fixed thereto, and which are spaced apart by the same distance as the trunnion discs are spaced. The blade cradle and the pair of trunnion discs include a top opening to facilitate insertion of the wind turbine blade into the blade cradle assembly. The pair of trunnion discs each have a circular outer periphery portion along equal radii that correspond with the first and second arcs of rotation, and each have an edge profiles that conform to the grooved wheel profiles. And, the circular outer periphery portions of the pair of trunnion discs rotatably engage the grooved wheels in the first and second pairs of bearing cradles, respectively, to thereby facilitate rotation of the bearing cradle assembly about the common longitudinal axis of rotation.

In a specific embodiment, the foregoing support fixture further includes a stacking frame portion selectively attachable to an upper portion of the base frame, to provide structure above the wind turbine blade and enable stacking of plural similar support fixtures.

In a specific embodiment of the foregoing support fixture, the grooved wheels are V-groove wheels, and the pair of parallel trunnion disc edge profiles employ bevelled edges to conform with the V-groove wheels.

In a specific embodiment, the foregoing support fixture further includes an anti-rotation assembly disposed between the base frame and the blade cradle assembly, which is selectively engageable at plural rotatable position about the common longitudinal axis of rotation, to thereby fix the blade cradle assembly and the wind turbine blade against rotation.

In a specific embodiment of the foregoing support fixture, the blade cradle is formed of a generally U-shaped structural material, and includes a slotted opening formed into an upper portion thereof, through which the wind turbine blade can be inserted from above.

In a specific embodiment, the foregoing support fixture further includes a conformal insert having an exterior shape conformed to fit the blade cradle along its interior surface, and having an interior opening conformed to an exterior surface of the wind turbine blade at a position from which such wind turbine blades is to be supported.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components, and method steps, have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

The wind turbine blade support fixtures of the present disclosure enable rotation of the wind turbine blade along its longitudinal axis so that the broadest chord of the airfoil, as well as the curvature of the blade itself, can be aligned to benefit clearance within the transportation vehicle being employed, and to benefit clearance along the transportation pathway. Generally, a root end support fixture and a tip end support fixture will function cooperatively to support the blade and enable rotation along its longitudinal axis. The tip end support fixture does not actually support the blade at its tip end, per se, rather it supports the blade along its length, usually at a location designated by the blade manufacturer, which has the requisite strength to carry the loads and stresses.

The support fixtures of the present disclosure are suitable for use in multiple modes of transportation, including ocean vessels, barges, railcars, and trucks, as well as for the static storage of wind turbine blades. In certain modes of transportation, tightly packing plural blades together is desirable. Ocean and barge transport are examples of this. To facilitate this packing, the support fixtures of the present disclosure are stackable, both vertically and horizontally to achieve this goal. In other modes of transportation, it is desirable to align the broadest chord of the wind turbine blade horizontally, such as a truck having limited room to clear overpasses. In other modes it is desirable to align the broadest chord vertically, as on a railcar where there are structures adjacent to the sides of the railway.

Figure 1:
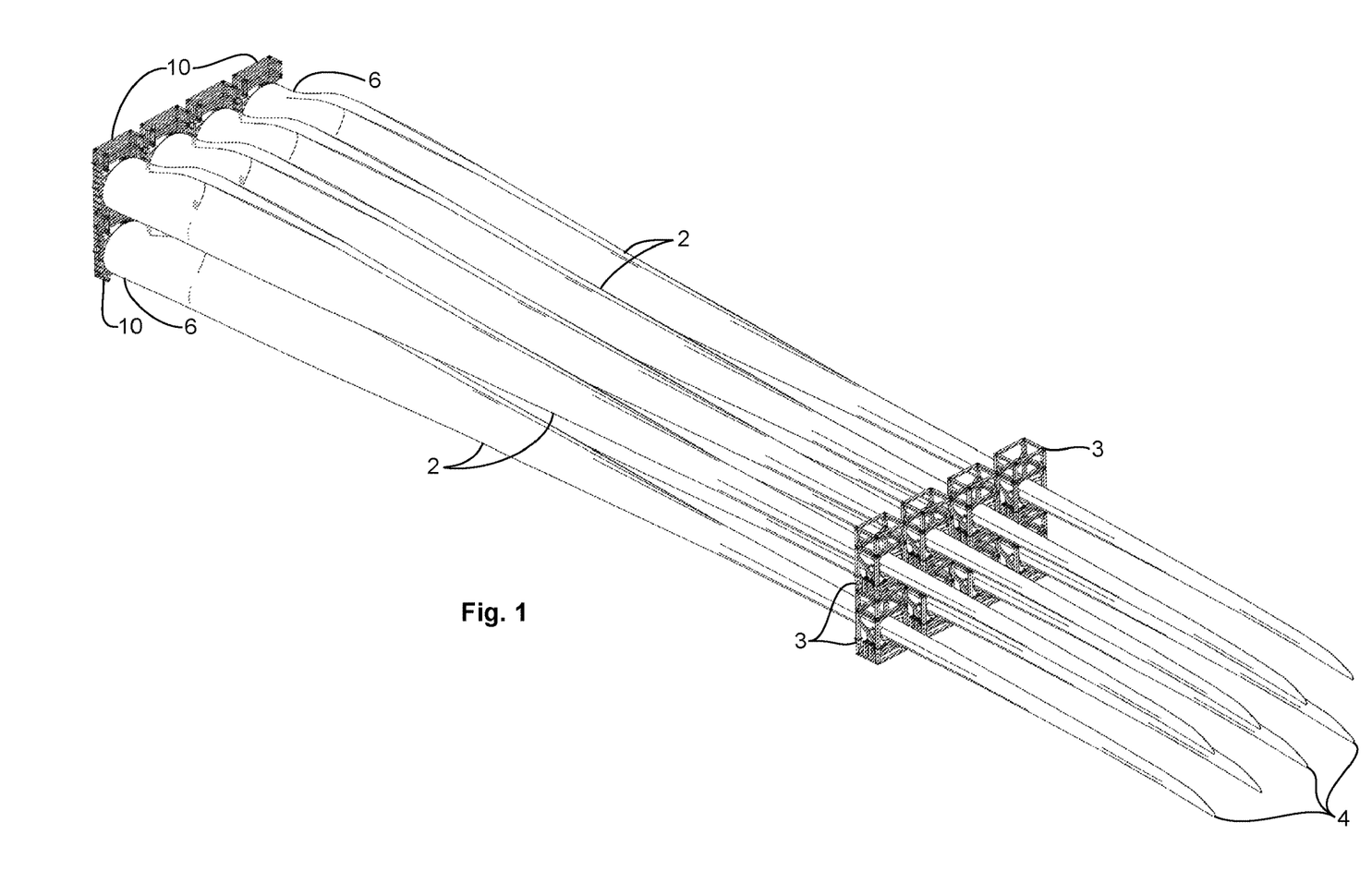
FIG. 1 is perspective view drawing of plural wind turbine blades supported by plural stacked root end fixtures and plural stacked blade support fixtures according to an illustrative embodiment of the present invention.

Reference is directed to FIG. 1, which is perspective view drawing of plural wind turbine blades 2 supported by plural stacked root end fixtures 10 and plural stacked blade support fixture assemblies 3 according to an illustrative embodiment of the present invention. This embodiment is an example of how blades 2 may be arranged for static storage, or for transportation upon ocean vessels and barges. Note the plural wind turbine blades 2 each have a root end 6, which is where the blade is affixed to a rotary hub on a generator nacelle (not shown), as will be appreciated by those skilled in the art. Each of the blades also has a tip end 4, where the two ends 4,6 generally define a longitudinal axis of each wind turbine blade. The plural root end fixtures 10 are stacked both vertically and horizontally, and to the extend desired for the intended purpose of storage or transportation. Likewise, the plural tip end support fixture assemblies 3 are also stacked both vertically and horizontally. For these applications, the rotational orientation of the plural blades 2 is selected such that the blades to not interfere, in position, with one another.

Figure 2:
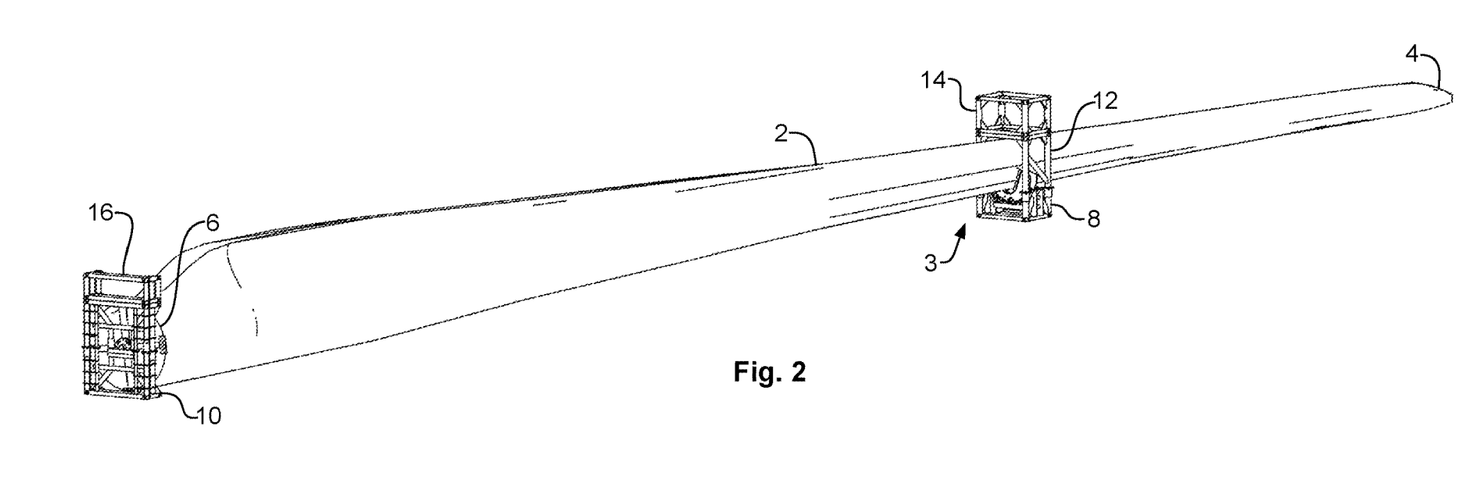
FIG. 2 is perspective view drawing of a wind turbine blade supported by a root end fixture and a blade support fixture according to an illustrative embodiment of the present invention.

Reference is directed to FIG. 2, which is perspective view drawing of a wind turbine blade 2 supported by a root end fixture 10 and a blade support fixture assembly 3 according to an illustrative embodiment of the present invention. This embodiment is an example of a fixture set 10, 3, which is suitable for use in all of the transportation modes, and which is most pertinent to rail and truck modes of transportation. Note that further details of the respective fixtures 10, 3 are presented in this embodiment as compared to the embodiment of FIG. 1. For example, note that the blade's 2 root end 6 fixture 10 includes a stacking frame 16, which may be provided where the blade 2 maximum cord height is taller than the root fixture 10. The stacking frame 16 can be omitted where vertical stacking is not needed. In this figure, the stacking frame 16 is shown for illustrative purposes. The blade support fixture assembly 3 includes a base frame 8 and a stacking frame portion 12 that is selectively attachable to the base frame 8, as needed, depending on the transportation mode being employed. Note also that the support fixture assembly 3 also includes a supplemental stacking frame 14, so as to match the height of the root end fixtures 10, 16 where plural blades are stacked vertically. Further details of the base frame 8 and the stacking frame portion 12 will be more fully discussed hereinafter.

Figure 3:
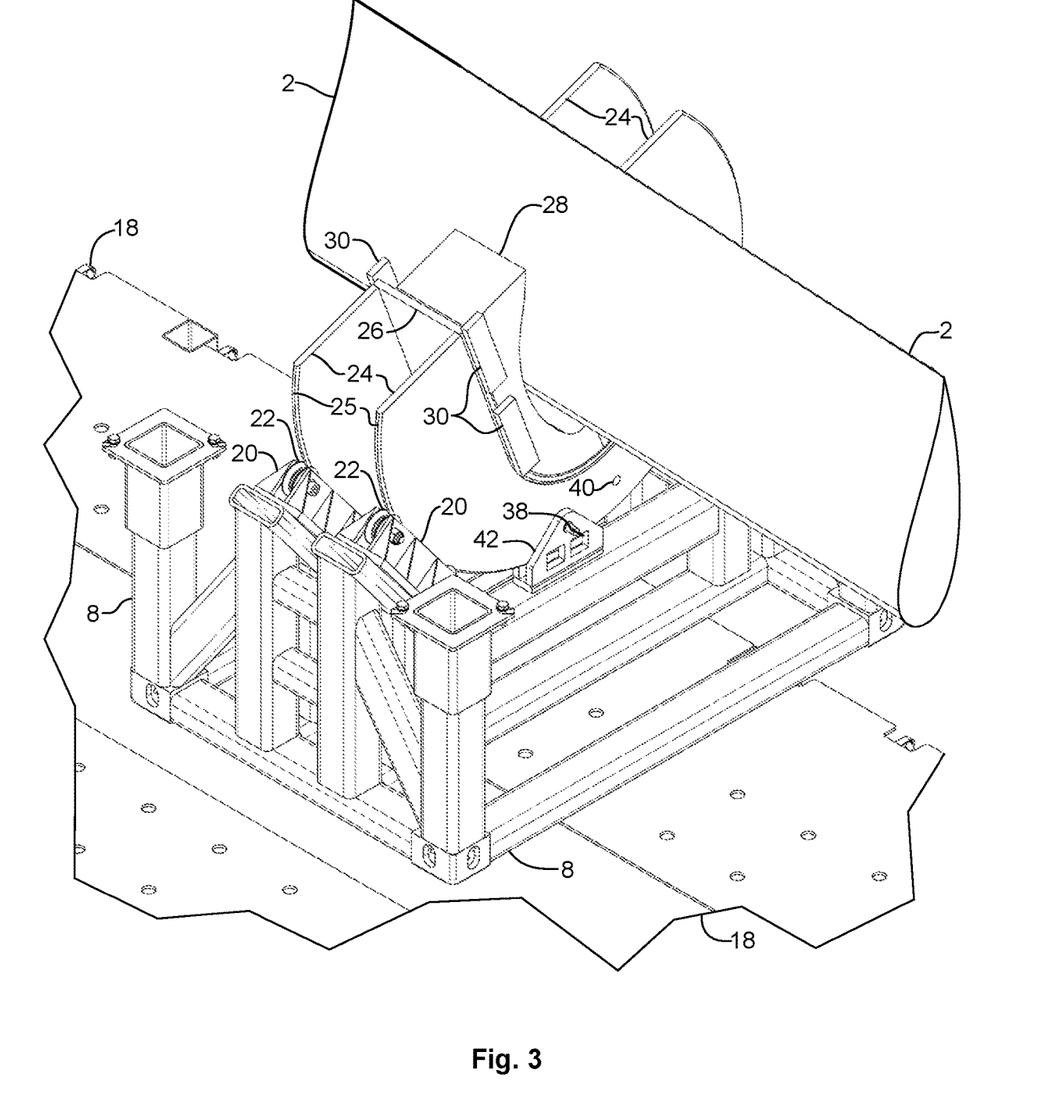
FIG. 3 is perspective view drawing of a wind turbine blade supported by a blade support fixture according to an illustrative embodiment of the present invention.

Reference is directed to FIG. 3, which is perspective view drawing of a wind turbine blade 2 supported by a blade support fixture according to an illustrative embodiment of the present invention. A base frame 8 is positioned on a horizontal surface 18 of a shipping vehicle or storage facility. The base frame 8 is fabricated from structural steel members, such as square and rectangular mild steel tubing sections. Other sections shapes could also be effectively employed, as will be appreciated by those skilled in the art. Plural bearing pedestals 20 are fixed to the base frame 8. Each of the plural bearing pedestals 20 rotatably support grooved wheels 22. In the illustrative embodiment, V-grooved wheels 22 are employed, but other wheel profiles could also be employed. A pair of trunnion discs 24 engage the grooved wheels 22 along a circular outer periphery portion 25 having an edge profiles that correspond and match the groove profile in the plural wheels 22. As such, the circular outer periphery portion 25 engages and rides on the wheels 22 in the manner of the wheels and a rail, providing a guiding action for rotation of the pair of trunnion discs 24 about a circular arc of rotation on the wheels.

The pair of trunnion discs 24 are fixedly joined together by a blade cradle 26, resulting an assembly referred to as the blade cradle assembly. The pair of trunnion discs 24 are fabricated from mild steel plate. The blade cradle 26 is also fabricated from mild steel plate, which is rolled into a U-shape. The pair of trunnions discs 24 have cut-outs along the perimeter of the blade cradle 26, which provides an opening into which the blade 2 may be inserted. It would typically be inserted from above via cranes (not shown). The components of the blade cradle assembly are welded together to yield a rigid structure. The blade cradle 26 opening is substantially larger than the blade 2 profile, and this is beneficial because it enables various different size blades, which can be supported along various positions on the blades, to be accommodated by the blade cradle 26. A conformal insert 28 is provided to support the blade 2 in the blade cradle 26. The conformal insert 28 has an exterior shape conformed to fit the blade cradle 26 along its interior surface, and has an interior opening conformed to an exterior surface of the wind turbine blade at the position from which it is supported. Various materials can be employed to fabricate the conformal insert 28, and in the illustrative embodiment, a closed cell polymeric foam material is utilized. In this manner, different conformal inserts can be fabricated to support various size blades using a common fixture. The conformal insert 28 is located in place along the longitudinal direction of the blade 2 using plural clips or brackets 30 that are affixed to the blade cradle assembly.

The rotational position at which the blade cradle 26 is oriented, which also orients the blade 2, is selected based on the requirements of the shipping system and transit route, or storage environment, as will be appreciated by those skilled in the art of transportation logistics. When the desired position is reached, the pair of trunnion discs 24 and blade cradle 26 are locked into position using an anti-rotation assembly, which consists of a bracket 42 fixed to the base frame 8 and a locating pin 38, which is inserted into one of plural holes 40 formed through the trunnion disc 24. There may be anti-rotation assemblies engaging both of the trunnions discs 24.

Figure 4:
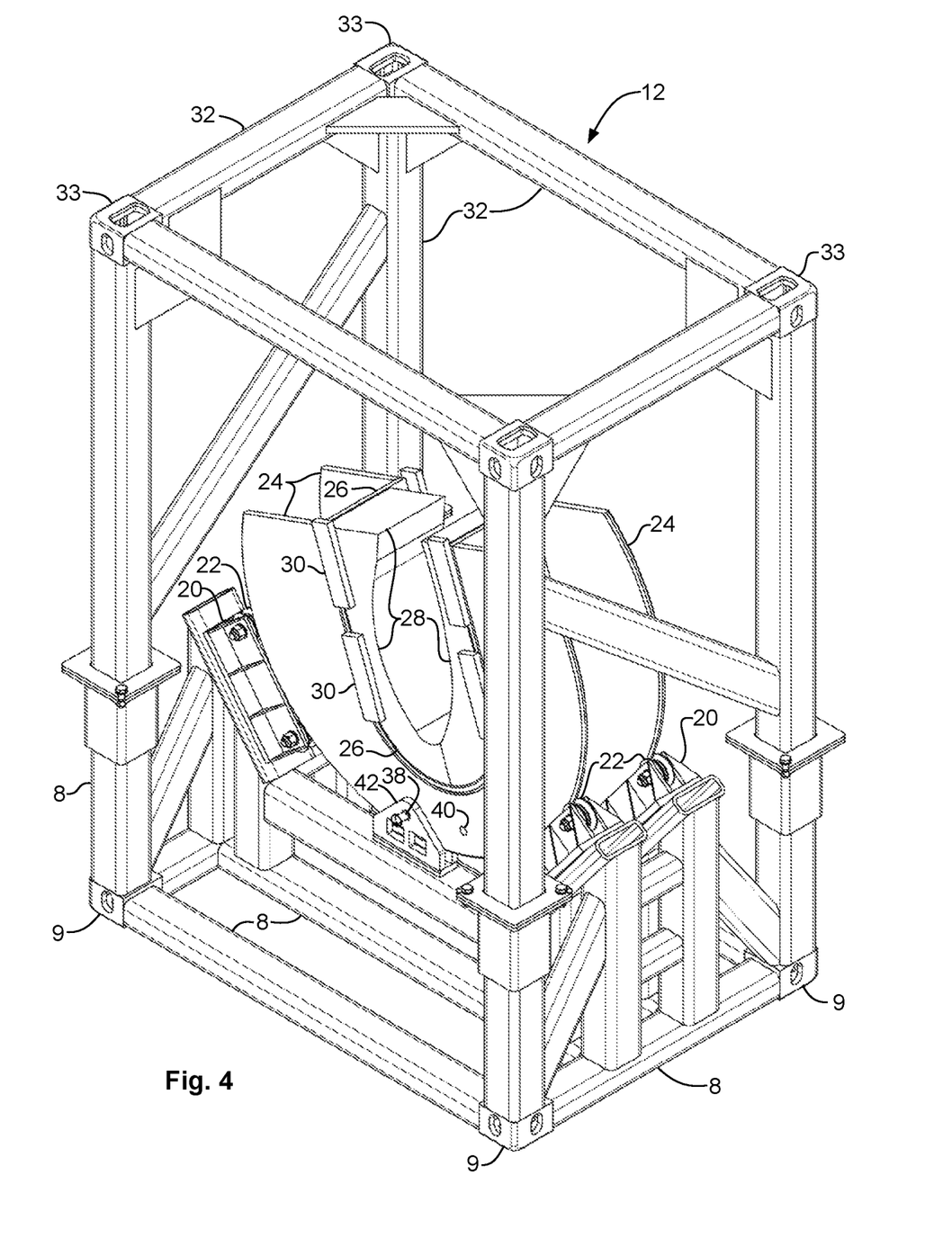
FIG. 4 is perspective view drawing of a blade support fixture with stacking frame according to an illustrative embodiment of the present invention.

Reference is directed to FIG. 4, which is perspective view drawing of a blade support fixture with stacking frame portion 12 according to an illustrative embodiment of the present invention. The base frame 8 includes plural twistlock corner castings 9 positioned at it lower corners, which enable connection of the base frame 8 to a deck surface or to other shipping components (not shown) using conventional twistlock couplers (not shown). The twistlock connection system, employing corner castings, twistlock couplers, and other components is well known to those in the intermodal shipping arts. The stacking frame portion 12 is fixed to the base frame 8, which connection will be more fully described hereinafter. The stacking frame portion 12 is fabricated from mild steel tubing sections 32 and also includes plural twistlock corner castings 33 at its upper corners. The stacking frame portion 12 provides an enclosed cage when assembled with the base frame 8, through which the wind turbine blade (not shown) passes. This arrangement protects the blade and enables stacking of the fixtures.

FIG. 4 also provides further details of the assembled blade support fixture. Note the bearing pedestal 20 locations, three of the four bearing pedestals 20 are visible in this view. Each of the bearing pedestals has two grooved wheels 22 rotatably supported thereby. Each opposing pair of bearing pedestals 20 support one of the pair of trunnion disc 24, and define a circular arc of rotation of the trunnion disc 24 thereon. The blade cradle 26 is disposed between the pair of trunnion discs 24, and is lined with the conformal insert 28, which is retained by plural clips 30.

Figure 5:
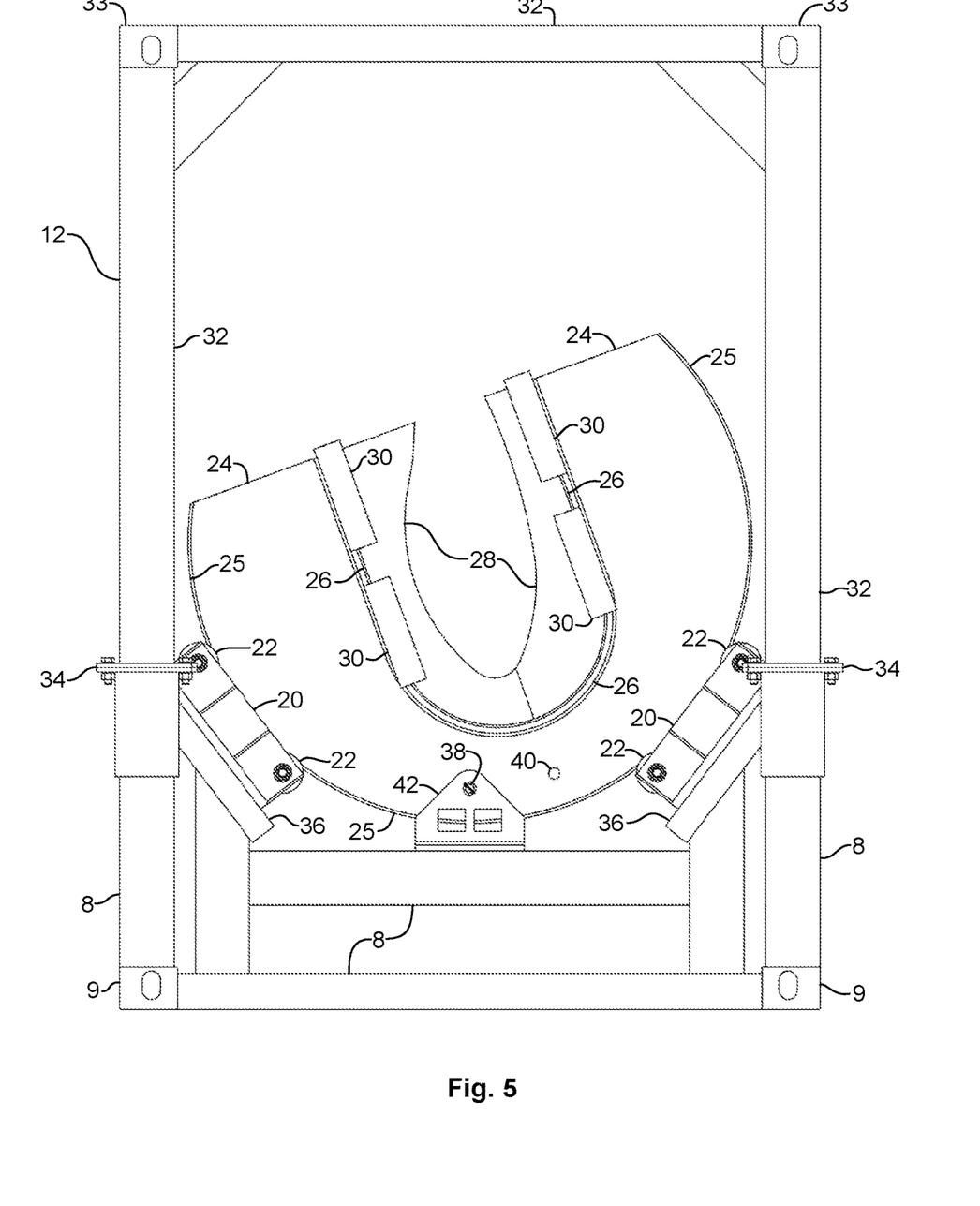
FIG. 5 is an end view drawing of a blade support fixture with stacking frame according to an illustrative embodiment of the present invention.

Reference is directed to FIG. 5, which is an end view drawing of a blade support fixture with stacking frame portion 12 according to an illustrative embodiment of the present invention. This view reveals further details of the support fixture components. The stacking frame portion 12 is fixed to the base frame 8 at plural connections 34, which will be more fully described hereinafter. The stacking frame portion 12 has plural twistlock corner castings 33, as does the base frame 8 have plural twistlock corner castings 9. In this view, the orientation of the plural bearing pedestals 20, with corresponding grooved wheels 22 in relation to the trunnion discs 24 can be readily visualized. Note that the bearing pedestals 20 are mounted to the base frame 8 along opposing inclined mounting surfaces 36. The angle and position of these inclined portions 36 are selected such that the bearing pedestals 20 can be, and are, bilaterally symmetrical. This symmetry enables all the bearing pedestals 20 to utilize a common design, and to be reversible and interchangeable at any mounting position. Note that the plural grooved wheels 22 define a circular arc of rotation for the trunnion discs 24, about a longitudinal axis of rotation. The location and implementation of the anti-rotation bracket 42 fixed to the base frame 8 and the locating pin 38, which is inserted into one of plural holes 40 formed through the trunnion disc 24, can be visually appreciated. This Figure also illustrates the orientation of the blade cradle 26 with the trunnion discs 24, and the implementation of the conformal insert 28 to accommodate the blade profile at the point of support. The conformal insert 28 retaining clips 30 is also readily visible.

Figure 6:
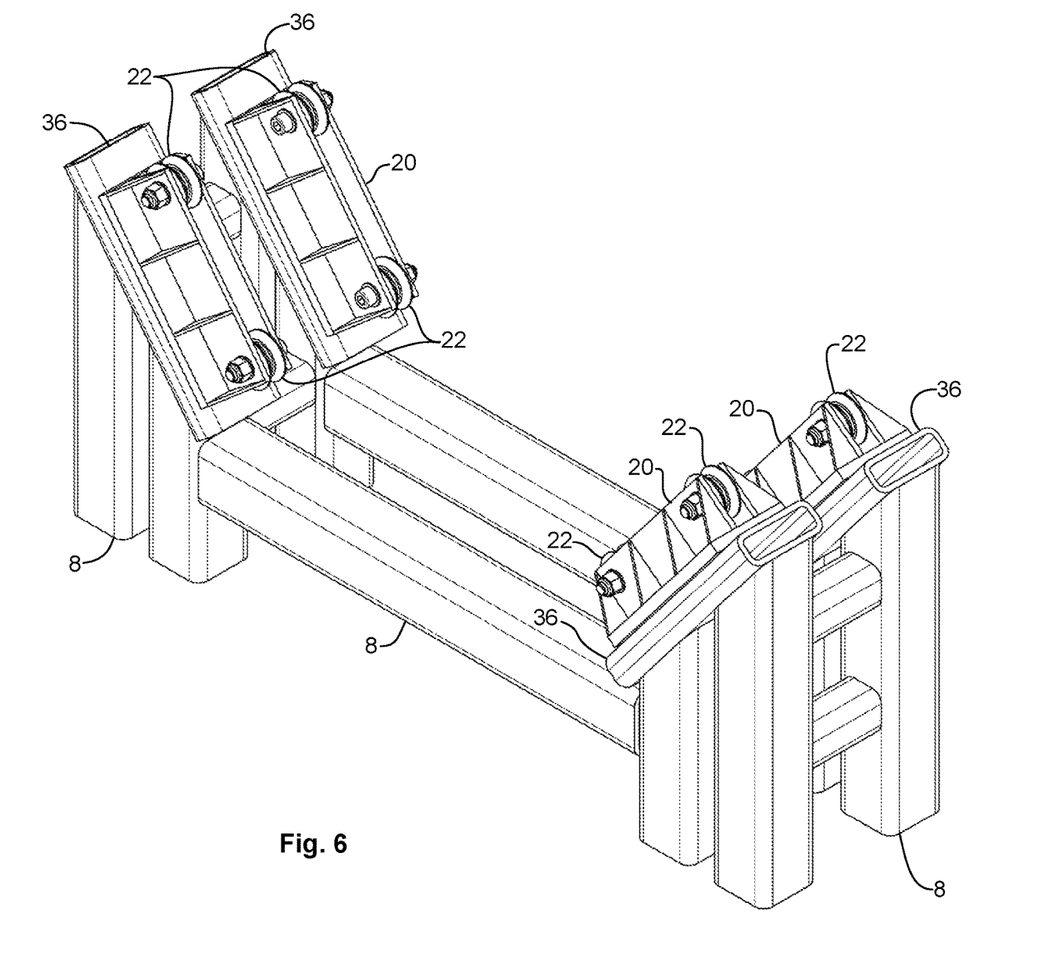
FIG. 6 is a perspective view drawing of an included bearing pedestal with grooved wheels according to an illustrative embodiment of the present invention.

Reference is directed to FIG. 6, which is a perspective view drawing of the inclined bearing pedestals 20 with grooved wheels 22 according to an illustrative embodiment of the present invention. The bearing pedestals 20 are mounted to the base frame 8 along four inclined mounting surfaces 36, which are fabricated from mild steel structural components, as illustrated. The angle and position of these inclined portions 36 are selected such that the bearing pedestals 20 can be, and are, bilaterally symmetric. This symmetry enables all the bearing pedestals 20 to utilize a common design, and to be reversible and interchangeable at any mounting position. The bilaterally symmetry is about a plane that is parallel to the parallel wheel axes and located midway between corresponding pairs of the grooved wheels 22.

Figure 7:
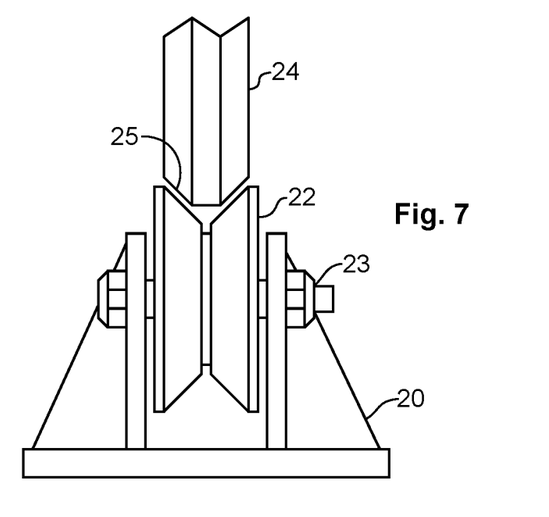
FIG. 7 is a detail view drawing of a beveled edge trunnion nearly engaging a V-groove wheel according to an illustrative embodiment of the present invention.

Reference is directed to FIG. 7, which is a detail view drawing of a beveled edge 25 trunnion disc 24 nearly (for drawing clarity) engaging a V-groove wheel 22 according to an illustrative embodiment of the present invention. V-groove wheels 22 are commercially available, as are other grooved wheel configurations, including U-grooved wheels. The wheels 22 are supported by the bearing pedestal 20 by an axle bolt 23, in a conventional manner. The commercially available wheels typically have internal sealed ball bearings. Note that the out peripheral edge 25 of the trunnion disc 24 is beveled such that the edge 25 corresponds to the groove in the V-grooved wheel 22.

Figure 8A:
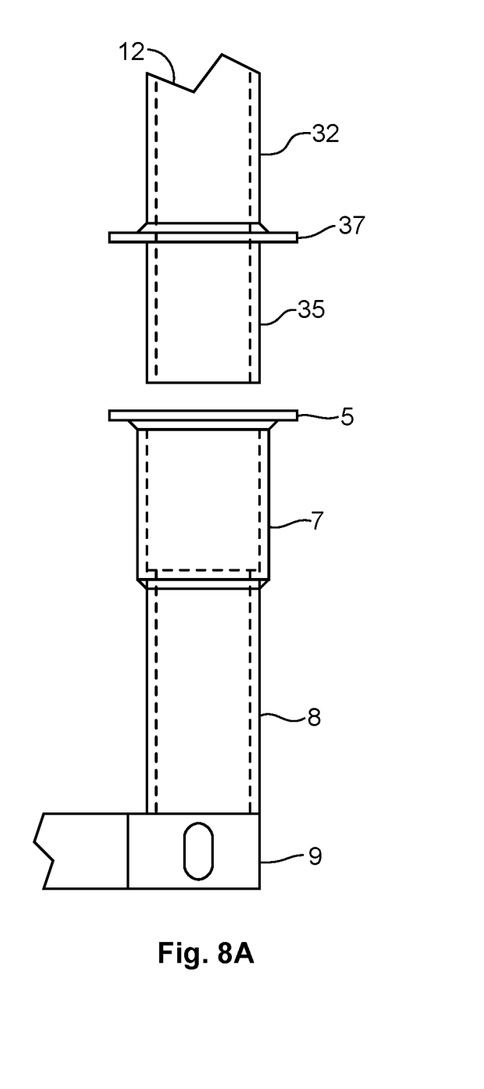
FIGS. 8A and 8B are detail drawings of a stacking frame column engaging a base frame column according to an illustrative embodiment of the present invention.
Figure 8B:
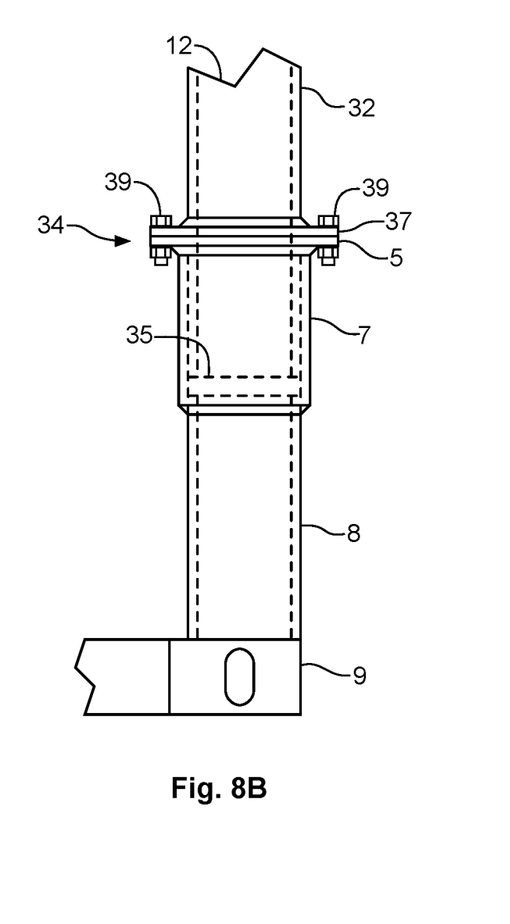

Reference is directed to FIGS. 8A and 8B, which are detail drawings of a stacking frame portion 12 column 32 engaging a base frame 8 column according to an illustrative embodiment of the present invention. The structural integrity of the connection between the base frame 8 and the stacking frame portion 12 is important. To facilitate the removable feature of this connection, the illustrative embodiment employs a telescopic tube arrangement, as illustrated in FIGS. 8A and 8B. The base frame 8 employs a larger tube portion 7 with a mounted flange 5 welded to an upper end thereof. The stacking frame 12 structural tube 32 also has a mounted flange 37 welded thereto. And, also includes a tube extension 35 below the flange 37. The tube extension 35 fits within the larger tube portion 7 in the base frame 8 to facilitate a telescopic engagement, which slide together until the corresponding flanges 5, 37 mate at the connection point 34, where they are bolted 39 together.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A support fixture for a wind turbine blade, comprising:
a base frame configured to rest on a horizontal structure, wherein the base frame includes a plurality mounting surfaces;
four bearing pedestals fixed directly to said plurality mounting surfaces respectively, each bearing pedestal comprising a pair of flanges, wherein each pair of flanges receive a pair of grooved wheels therein that rotate along parallel axes respectively, wherein the four bearing pedestals comprise first and second pairs of bearing pedestals that are laterally opposing and oriented such that each corresponding pair of grooved wheels are disposed along corresponding first and second circular arcs of rotation, having equal radii, and wherein
corresponding pairs of bearing pedestals are longitudinally spaced apart a distance such that corresponding first and second circular arcs of rotation of each pair of grooved wheels of said corresponding pairs of bearing pedestals are parallel to one another and aligned along a common longitudinal axis of rotation respectively;
a blade cradle assembly comprising a blade cradle defining a U-shaped interior surface and a pair of generally U-shaped trunnion discs each having a circular outer periphery portion, aligned in parallel, which are spaced apart by said distance, and wherein said blade cradle extends said distance and connects the pair of trunnion discs, and said pair of trunnion discs each include an opening therethrough which align with said U-shaped interior surface of said blade cradle to facilitate insertion of the wind turbine blade into said blade cradle assembly, and wherein
said circular outer periphery portions of said pair of trunnion discs lie along said equal radii of said corresponding first and second arcs of rotation, respectively, and each circular outer periphery portion having an edge received in two corresponding pairs of grooved wheels respectively so that four corresponding grooved wheels engages each trunnion disc at different positions along each circular outer periphery portion respectively, and wherein
said circular outer periphery portions of said pair of trunnion discs rotatably engage said grooved wheels of said first and second pairs of bearing pedestals, respectively, to thereby guide rotation of said bearing cradle assembly about each common longitudinal axis of rotation respectively.

2. The support fixture of claim 1, wherein
said four bearing pedestals are symmetric about a plane that is located midway between said first and second pair of bearing pedestals.

3. The support fixture of claim 1, wherein
said base frame further comprises a plurality of twistlock corner castings configured to secure the support fixture to a transportation vehicle or to other support fixtures.

4. The support fixture of claim 1,
wherein the support fixture is a first support fixture; wherein a stacking frame portion is selectively attachable to an upper portion of said base frame to provide structure above the wind turbine blade and enable stacking of at least one second support fixture that is identical to the first support fixture thereon.

5. The support fixture of claim 4, wherein
said stacking frame portion is telescopically attached to said base frame.

6. The support fixture of claim 1, wherein
said grooved wheels are V-groove wheels, and wherein
said edges of the pair of parallel trunnion discs are bevelled edges.

7. The support fixture of claim 1, further comprising
an anti-rotation assembly disposed between said base frame and said blade cradle assembly, which selectively engages said blade cradle assembly at a plurality of positions to thereby fix and prevent rotation of said blade cradle assembly and the wind turbine blade at each respective position.

8. The support fixture of claim 7, wherein
said anti-rotation assembly comprises a bracket fixed to said base frame, a locating pin, and plural holes formed through at least one of said trunnion discs, wherein said locating pin is inserted through said bracket and one of said plural holes from said at least one of said trunnion discs.

9. The support fixture of claim 1, further comprising:
a conformal insert having an exterior shape conformed to fit said blade cradle along the U-shaped interior surface, and said conformal insert having an interior opening conformed to an exterior surface of the wind turbine blade.

10. The support fixture of claim 9, wherein
said conformal insert is fabricated from a closed cell polymeric foam material.

11. The support fixture of claim 9, further comprising a plurality of conformal insert retaining guides fixed to said blade cradle assembly, and aligned to limit longitudinal movement of said conformal insert.

12. A support fixture for a wind turbine blade, the support fixture suitable for intermodal shipment via an ocean vessel, a barge, a train or a truck, the support fixture comprising:
 a base frame configured to rest on a horizontal structure, wherein the base frame includes a plurality of inclined mounting surfaces;
 a plurality of bearing pedestals fixed to said inclined mounting surfaces of the base frame,
 each bearing pedestal comprising a base member and a pair of flanges that extend from each base member respectively, wherein the base members of the bearing pedestals are fixed directly to the inclined mounting surfaces, wherein each pair of flanges receives at least one grooved wheel therein that rotates along an axis substantially parallel to a longitudinal axis of the wind turbine blade;
 said plurality of bearing pedestals comprise a first and second pair of bearing pedestals that are laterally opposing and oriented such that each grooved wheel of the first and second pairs of bearing pedestals are disposed along at least one circular arc of rotation respectively, and have equal radii, and
 wherein corresponding pairs of bearing pedestals are longitudinally spaced apart a distance such that corresponding circular arcs of rotation of corresponding wheels of each corresponding pair of bearing pedestals are parallel to one another and aligned along at least one common longitudinal axis of rotation that is substantially parallel to the longitudinal axis of the wind turbine blade;
 a blade cradle assembly comprising a blade cradle defining a continuous U-shaped interior surface and a pair of generally U-shaped trunnion discs each having a circular outer periphery portion, wherein said pair of trunnion discs are aligned in parallel and spaced apart by said distance, and wherein said blade cradle extends said distance and connects the pair of trunnion discs, and said pair of trunnion discs each include an opening therethrough which aligns with said U-shaped interior surface of said blade cradle to facilitate insertion of the wind turbine blade into said blade cradle assembly, and wherein
 said circular outer periphery portions of said pair of trunnion discs lie along said equal radii corresponding to each arc of rotation respectively, each circular outer periphery having an edge that is received in each corresponding grooved wheel of at least two of the bearing pedestals respectively, and wherein
 said circular outer periphery portions of said pair of trunnion discs rotatably engage each grooved wheel of said first and second pairs of bearing pedestals respectively, to thereby facilitate rotation of said bearing cradle assembly about each common longitudinal axis of rotation.

13. The support fixture of claim 12,
 wherein the support fixture is a first support fixture; wherein a stacking frame portion is selectively attachable to an upper portion of said base frame to provide structure above the wind turbine blade and enable stacking of at least one second support fixture that is identical to the first support fixture thereon.

14. The support fixture of claim 12, wherein
 each grooved wheel is a V-groove wheel, and wherein
 said edges of the pair of parallel trunnion discs are bevelled edges.

15. The support fixture of claim 12, further comprising
 an anti-rotation assembly disposed between said base frame and said blade cradle assembly, which selectively engages said blade cradle assembly at a plurality of positions to thereby fix and prevent rotation of said blade cradle assembly and the wind turbine blade at each respective position.

16. The support fixture of claim 12, further comprising
 a conformal insert having an exterior shape configured to fit said blade cradle.

* * * * *